Aug. 28, 1962     S. P. NOVAK     3,051,420

AIRCRAFT SAFETY DEVICE

Filed Jan. 9, 1961

INVENTOR.
STANLEY P. NOVAK
BY Robert K. Youtie
ATTORNEY.

United States Patent Office 3,051,420
Patented Aug. 28, 1962

3,051,420
AIRCRAFT SAFETY DEVICE
Stanley P. Novak, 2 Highland Ave., Belmont Hills 27, Pa.
Filed Jan. 9, 1961, Ser. No. 81,598
6 Claims. (Cl. 244—139)

This invention relates generally to aircraft safety devices, and is especially concerned with means for retarding the fall of an airplane in an emergency.

It is one object of the present invention to provide a unique construction wherein a pair of parachutes may be safely released from an air plane for opening exteriorly thereof and remain connected to the airplane for effectively retarding the fall of a disabled airplane and permit its gradual and safe return to ground.

It is a further object of the present invention to provide a plurality of safety parachutes for permitting relatively slow descent of a disabled airplane, which chutes may be relatively large for effective retarding action and are released in a novel manner to prevent fouling of the parachute lines.

It is still a further object of the present invention to provide unique and advantageous means for connecting the opened parachutes to the airplane, to insure firm connection thereto and prevent the formation of excessive local stresses in the aircraft structure.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

Figure 1:
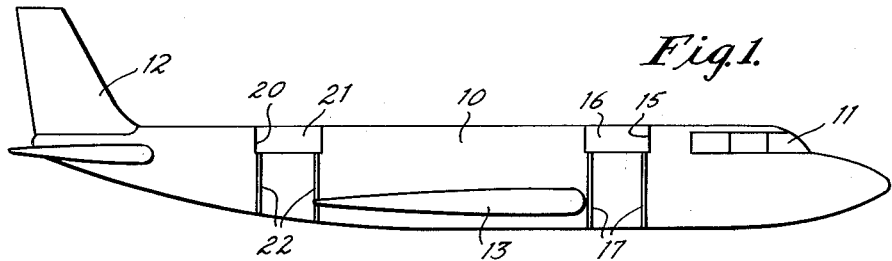
FIGURE 1 is a side elevational view showing an aircraft constructed in accordance with the teachings of the present invention and in normal flight condition.

Referring now more particularly to the drawing, and specifically to FIGURE 1 thereof, an airplane fuselage is there designated 10, and is provided with a forward cabin 11, a rear tail 12, and laterally extending wings 13, which may all be conventional.

In an upper, forward region of the fuselage 10, there is formed an upwardly facing opening 15 having a removable cover or closure 16. A pair of bands 17, which are preferably fabricated of strong flexible material, extend in parallelism with each other exteriorly about the bottom and sides of the fuselage 10, each having its ends entering into the opening 15. Thus, the bands 17 girdle the sides and nether portion of the fuselage 10 and enter into the opening 15, for a purpose appearing presently.

In a rearward upper region of the fuselage 10, spaced forward of the tail 12, there is formed another upwardly facing opening 20; and, a removable cover or closure 21 may be provided over the opening 20. The rear opening 20 and its closure 21 may be substantially identical to the forward opening 15 and its closure 16. Also, a pair of belts or bands 22, preferably of strong, flexible material, may extend in substantial parallelism about the sides and under-region of the fuselage 10 adjacent to the rear opening 20 and entering into the latter. That is, the bands 22 girdle the fuselage 10 in the region of rear opening 20 in substantially the same manner as the forward bands or belts 17.

Figure 3:
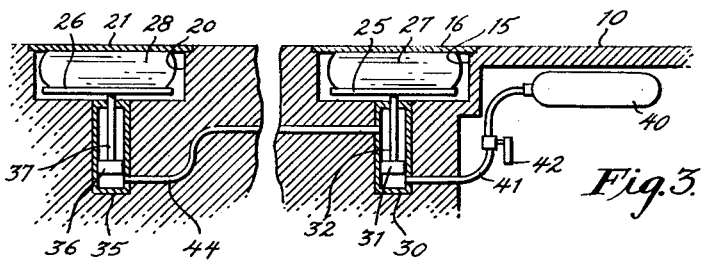
FIGURE 3 is a fragmentary sectional view, partly broken away, showing the parachute-release mechanism of the present invention.

Located in each of the upwardly facing fuselage openings 15 and 20 is an ejection member or platform, being respectively designated 25 and 26. On the respective platforms 25 and 26, within the openings 15 and 20 are carried packed parachutes 27 and 28, respectively. That is, a forward parachute 27 is located in the forward opening 15 on the forward ejection platform 25, and a rearward parachute 28 is located in the rearward opening 20 on the rearward ejection platform 26. In the condition of FIGURES 1 and 3, the parachutes 27 and 28 are entirely received within their respective openings 15 and 20 beneath the covering closures 16 and 21. By suitable means the parachutes 27 and 28 are connected to their respective supporting ejection platforms 25 and 26 in a manner permitting release or opening of the parachutes exteriorly of the fuselage 10.

Beneath the opening 15 is a generally vertically disposed cylinder 30, which contains a vertically slidable piston 31 having a rod 32 extending vertically upward slidably through the upper end of cylinder 30 for connection to the ejection member 25. A similar vertically disposed cylinder 35 is located directly beneath the rear fuselage opening 20 and carries interiorly thereof a vertically slidable cylinder 36. A piston rod or shaft 37 extends vertically upward from the piston 36 slidably through and beyond the upper end of cylinder 35 where it is connected to the ejection member 26.

A reservoir or tank 40 is mounted in the fuselage 10 for containing a source of fluid under pressure, such as compressed air. Connected between the reservoir 40 and the lower end of forward cylinder 30 is a fluid conduit 41 in which is interposed an actuating valve 42. Thus, upon opening of the valve 42 fluid pressure is transmitted from the reservoir 40 through the conduit 41 to the underside of piston 31 in cylinder 30, which exerts an upward force on ejection member 25 to remove the cover 16 and permit opening of the parachute 27 exteriorly of the fuselage.

An additional fluid conduit 44 is connected in fluid communication between an upper region of the forward cylinder 30 and the lower region of rear cylinder 35. Thus, upon sufficient upward movement of forward piston 31 to open conduit 44 to fluid under pressure, the same is transmitted to the lower region of rear cylinder 35 to effect upward movement of rear piston 36. It will now be appreciated that this upward movement of rear cylinder 36 occurs only after upward movement of forward cylinder 31. Thus, the above-described series fluid connection between source 40 and cylinders 31 and 35 effects a sequential operation of pistons 31 and 36.

Of course, upon upward movement of piston 36 to raise ejection member 26, the cover 21 is removed and parachute 28 exposed for opening exteriorly of the fuselage 10. The parachute 28 is connected to its ejection member 26 to permit full opening.

Figure 2:
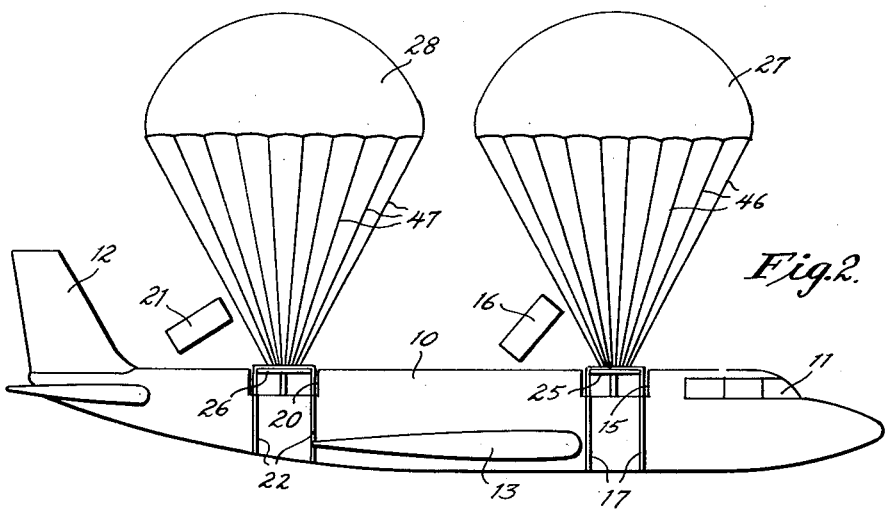
FIGURE 2 is a side elevational view similar to FIGURE 1, but showing the aircraft in an emergency condition with the parachutes released.

The emergency condition is shown in FIGURE 2 where both forward and rearward parachutes 27 and 28 have been released by actuation of valve 42 to sequentially operate ejection members 25 and 26. The forward parachute 27 is thereby released for opening first, and subsequent to opening of the forward parachute 27, the rear parachute 28 is released for its opening exteriorly of the fuselage 10. In this manner, the forward parachute 27 and its lines 46 are prevented from accidental fouling with the rear parachute 28 and its lines 47.

As seen in FIGURE 2, the lines 46 of parachute 27 are connected to the ejection member or platform 25; and, the bands or belts 17 girding the sides and underregion of the fuselage 10 have their upper ends also connected to the ejection member. Thus, through the ejection member 25, the lines 46 of parachute 27 are connected to the belts or bands 17. By this arrangement, the retarding force exerted by the parachute 27 is not applied directly to a small local region of the fuselarge 10, but through the belts 17 is distributed over a substantial area of the fuselage.

The rear belts or bands 22 embracing the sides and underregion of the fuselage 10 adjacent to the opening 20 may have their upper ends connected to the rear ejection platform 26. Also, the lines 47 of the rear parachute 28 may be connected to the rear ejection platform 26, for connection of the rear parachute through its lines and ejection platform to the rear belts or bands 22. This construction serves to distribute the retarding force of the rear parachute over a substantial rear region of the fuselage 10 and prevent the creation of high local stresses.

It will now be appreciated that the parachutes 27 and 28 in their closed or packed condition of FIGURES 1 and 3, may in an emergency be released by upward movement of their supporting platforms 25 and 26 to dislodge the covers 16 and 21 and present the parachutes for opening exteriorly of the fuselage. When the parachutes are released and opened, as in FIGURE 2, a retarding force is applied by the parachutes to falling action of the fuselage 10, the force being well-distributed over the fuselage to prevent damage thereto, so that the airplane may glide slowly down and safely reach the earth.

From the foregoing, it is seen that the present invention provides an aircraft safety construction which fully accomplishes its intended objects and is well-adapted to meet practical conditions of manufacture, installation, maintenance and use.

Although the present invention has been described in some detail by way of illustration and example for purposes of clarity of understanding, it is understood that certain changes and modifications may be made within the spirit of the invention and scope of the appended claims.

What is claimed is:

1. In combination, an airplane fuselage having a pair of longitudinally spaced upwardly facing forward and rearward openings, forward and rearward packed parachutes disposed respectively in said forward and rearward openings, connection means connected to each of said parachutes and girdling said fuselage, an openable closure over each of said openings, and release means for sequentially ejecting said forward parachute and then said rearward parachute to open exteriorly of said fuselage without fouling of the parachute lines.

2. The combination according to claim 1, said release means comprising an ejection mechanism associated with each of said parachutes, and actuating means for actuating said ejection means.

3. The combination according to claim 2, said actuating means being connected serially to said ejection mechanisms for sequential operation thereof.

4. The combination according to claim 1, said connection means comprising a band connected to each of said parachutes and extending about the sides and nether region of said fuselage adjacent to the respective parachute.

5. The combination according to claim 1, said release means comprising forward and rearward fluid-pressure-operated ejection mechanisms respectively associated with said forward and rearward parachutes, a source of fluid pressure connected to said forward ejection mechanism, valve means normally closing said source to said forward ejection mechanism, and fluid-conduit means connected between said forward and rearward ejection mechanisms to close said source to said rearward ejection mechanism until after operation of said forward ejection mechanism.

6. The combination according to claim 5, said forward ejection mechanism comprising a cylinder having one end connected to said source, and a piston in said cylinder normally proximate to said one cylinder end adapted to be moved away from said one cylinder end by fluid pressure from said source, said conduit means being connected to said cylinder at a point remote from said one cylinder end, whereby said conduit means is closed to said source until piston movement away from said one cylinder end beyond said point.

References Cited in the file of this patent

UNITED STATES PATENTS

| | | |
|---|---|---|
| 757,825 | Maul | Apr. 19, 1904 |
| 1,692,108 | Bergmann | Nov. 20, 1928 |
| 1,849,970 | Barber | Mar. 13, 1932 |
| 1,856,397 | Motter | May 3, 1932 |
| 2,352,721 | Krahel | July 4, 1944 |
| 2,673,051 | Frost | Mar. 23, 1954 |